(12) United States Patent
Yang et al.

(10) Patent No.: US 11,819,834 B2
(45) Date of Patent: Nov. 21, 2023

(54) ALUMINOPHOSPHATE MOLECULAR SIEVE SCM-18, ITS PREPARATION AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Weimin Yang, Shanghai (CN); Zhiqing Yuan, Shanghai (CN); Jiawei Teng, Shanghai (CN); Wenhua Fu, Shanghai (CN); Songlin Liu, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, ShangHai (CN)

( * ) Notice: Subject to any disclaimer, the term of this patent is extended or adjusted under 35 U.S.C. 154(b) by 402 days.

(21) Appl. No.: 17/288,891

(22) PCT Filed: Sep. 19, 2019

(86) PCT No.: PCT/CN2019/106628
§ 371 (c)(1),
(2) Date: Apr. 26, 2021

(87) PCT Pub. No.: WO2020/082944
PCT Pub. Date: Apr. 30, 2020

(65) Prior Publication Data
US 2022/0001365 A1 Jan. 6, 2022

(30) Foreign Application Priority Data
Oct. 25, 2018 (CN) .......................... 201811250883.6

(51) Int. Cl.
| | | |
|---|---|---|
| *C01B 39/04* | (2006.01) | |
| *B01J 29/83* | (2006.01) | |
| *B01J 20/02* | (2006.01) | |
| *B01J 37/04* | (2006.01) | |
| *B01J 37/06* | (2006.01) | |
| *B01J 37/08* | (2006.01) | |
| *C01B 39/54* | (2006.01) | |

(52) U.S. Cl.
CPC ........... *B01J 29/83* (2013.01); *B01J 20/0292* (2013.01); *B01J 37/04* (2013.01); *B01J 37/06* (2013.01); *B01J 37/082* (2013.01); *C01B 39/54* (2013.01); *C01P 2002/72* (2013.01); *C01P 2006/12* (2013.01); *C01P 2006/14* (2013.01)

(58) Field of Classification Search
CPC ........ B01J 29/83; B01J 20/0292; B01J 20/18; B01J 20/28061; B01J 20/28071; B01J 20/3078; B01J 20/3085; B01J 20/02; B01J 37/04; B01J 37/06; B01J 37/082; C01B 37/04; C01B 39/54; C01B 39/04; C01P 2002/72; C01P 2006/12; C01P 2006/14
USPC .... 502/60, 64, 208, 400, 407, 414; 423/700, 423/701, 702, 704, 705, 706, 707, 718
See application file for complete search history.

(56) References Cited

U.S. PATENT DOCUMENTS

| | | |
|---|---|---|
| 4,310,440 A | 1/1982 | Wilson et al. |
| 4,440,871 A | 4/1984 | Lok et al. |
| 4,752,651 A | 6/1988 | Kaiser |
| 6,835,363 B1 | 12/2004 | Strohmaier |
| 2003/0129128 A1 | 7/2003 | Strohmaier et al. |
| 2006/0147364 A1 | 7/2006 | Venkatathri et al. |

FOREIGN PATENT DOCUMENTS

| | | |
|---|---|---|
| CN | 102092738 B | 3/2012 |
| CN | 103204484 B | 12/2014 |
| CN | 105776247 A | 7/2016 |
| CN | 106276943 A | 1/2017 |
| CN | 104445244 B | 2/2017 |
| EA | 008806 B1 | 8/2007 |
| EP | 0043562 A1 | 1/1982 |
| EP | 0293938 A1 | 12/1988 |
| EP | 0293939 A2 | 12/1988 |
| EP | 0406872 A3 | 1/1992 |
| RU | 2021975 C1 | 10/1994 |
| RU | 2154022 C2 | 8/2000 |
| WO | 2017095705 A1 | 6/2017 |

OTHER PUBLICATIONS

Flanigen E. M. et al.; Phosphorus Substitution in Zeolite Frameworks; Molecular Sieve Zeolites-I, Sep. 8, 1970, pp. 76-98, ACS, Washington D.C.

Saif, Muhammad Jawwad et al.; "Novel bis-piperidinium and bis-pyrrolidinium compounds as versatile phase-transfer catalysts"; General Paper ARKIVOC 2010; vol. (xi); Jan. 1, 2010; ISSN: 1551-7012pp. 133-145.

*Primary Examiner* — Elizabeth D Wood
(74) *Attorney, Agent, or Firm* — NKL Law; Allen Xue

(57) ABSTRACT

An aluminophosphate molecular sieve SCM-18 has a schematic chemical composition, expressed on a molar basis, of $Al_2O_3 \cdot n\, P_2O_5$, in which n represents a phosphorus to aluminum molar ratio, and is in a range of about 0.8-1.2. The aluminophosphate molecular sieve has a unique X-ray diffraction pattern, and can be used as an adsorbent, a catalyst or a catalyst carrier.

20 Claims, 2 Drawing Sheets

ALUMINOPHOSPHATE MOLECULAR SIEVE SCM-18, ITS PREPARATION AND APPLICATION THEREOF

TECHNICAL FIELD

The present application relates to the technical field of molecular sieves, in particular to an aluminophosphate molecular sieve, its preparation and application thereof.

BACKGROUND ART

Molecular sieves are a family of porous, crystalline materials, and over 250 types of molecular sieves with known structures have been discovered to date. Most molecular sieves have large internal specific surface areas and open internal spaces that serve as sites for reactions and for holding guest molecules, such as metals, metal oxides, organic molecules, water molecules, and the like. Since molecular sieves have uniform and regular pore channels, and the size of the pore channels is in the same order of magnitude as that of molecules, the entrance and exit of the molecules can be selected, and thus a shape selection effect can be obtained. Because of the above characteristics, molecular sieves are widely used as catalysts, carriers of catalysts, adsorbents, detergents and the like, and are widely applied in the fields of petrochemical industry, environmental protection, adsorption and separation.

The framework of molecular sieves is typically made up of coordinated tetrahedrons ($TO_4$) joined at a common vertex. For aluminophosphate molecular sieves, the framework of this type of molecular sieve is formed by connecting $AlO_4^-$ tetrahedrons and $PO_4^+$ tetrahedrons, so that the entire molecular sieve framework appears electrically neutral. Of course, similar to zeolite, aluminum or phosphorus in aluminophosphate molecular sieves can be replaced by other elements, most commonly silicon (the resulting molecular sieve is referred to as SAPO) and transition metal elements (the resulting molecular sieve is referred to as MAPO), and the introduction of these elements endows the aluminophosphate molecular sieves with new characteristics, such as solid acidity or redox properties, etc. The artificial synthesis studies of aluminophosphate molecular sieves are relatively late compared to zeolite molecular sieves.

In 1971, Flanigen et al reported the synthesis of aluminophosphate molecular sieves [Flanigen E. M. and Grose R. W., Phosphorus Substitution in Zeolite Frameworks. in Molecular Sieve Zeolites-I, 1970, P76-P98, ACS, Washington D.C.], which comprises mixing oxides of aluminum, silicon and phosphorus under hydrothermal synthesis conditions, and produces silicoaluminophosphate molecular sieves having the same crystal structure as analcime, chabazite, phillipsite-harmotome, zeolite L, A, and B, etc., where the phosphorus content is 5-25% (calculated as $P_2O_5$), but no structure different from that of zeolite is found.

U.S. Pat. No. 4,310,440 describes the hydrothermal synthesis of a series of aluminophosphate molecular sieves using organic amines or quaternary ammonium cations as templates, which include: $AlPO_4$-5, $AlPO_4$-8, $AlPO_4$-9, $AlPO_4$-11, $AlPO_4$-12, $AlPO_4$-14, $AlPO_4$-16, $AlPO_4$-17, $AlPO_4$-18, $AlPO_4$-20, $AlPO_4$-21, $AlPO_4$-22, $AlPO_4$-23, $AlPO_4$-25, $AlPO_4$-26, $AlPO_4$-28, $AlPO_4$-31, etc., and the templates used include tetramethylammonium hydroxide, tetraethylammonium hydroxide, tetrapropylammonium hydroxide, tetrabutylammonium hydroxide, tripropylamine, triethylamine, isopropylamine, butylamine, ethylenediamine, piperidine and its derivatives, cyclohexylamine, DABCO, quinuclidine, and the like.

U.S. Pat. No. 4,440,871 describes the synthesis of silicon-containing aluminophosphate molecular sieves including SAPO-5, SAPO-11, SAPO-16, SAPO-17, SAPO-20, SAPO-31, SAPO-34, SAPO-35, SAPO-37, SAPO-40, SAPO-41, SAPO-42, SAPO-44 and the like.

U.S. Pat. No. 4,752,651 describes the synthesis of a series of metal-containing silicoaluminophosphate molecular sieves including titanium-containing TiAPSO, magnesium-containing MgAPSO, manganese-containing MnAPSO, cobalt-containing CoAPSO, zinc-containing ZnAPSO and iron-containing FeAPSO, and the like.

For the synthesis of aluminophosphate molecular sieves, the organic template is a main factor determining the structure of the resulting molecular sieve, and a new molecular sieve is often obtained by using a new template. So far, organic amine and quaternary ammonium type organic compounds are templates most widely used in the synthesis of aluminophosphate molecular sieves.

SUMMARY OF THE INVENTION

It is an object of the present application to provide a novel aluminophosphate molecular sieve, its preparation and application thereof, which has a unique X-ray diffraction pattern and can be used as an adsorbent, a catalyst or a catalyst carrier.

In an aspect, the present application provides an aluminophosphate molecular sieve having a schematic chemical composition of $Al_2O_3 \cdot nP_2O_5$, expressed on a molar basis, wherein n represents the molar ratio of P to Al, and is in a range of about 0.8 to about 1.2, the molecular sieve has an X-ray diffraction pattern exhibiting a relative intensity profile as shown in the following table:

| 2 theta (°) | Interplanar spacing (Å) | Relative intensity ($I/I_0$) × 100 |
|---|---|---|
| 8.20-8.60 | 10.27-10.77 | VS |
| 13.73-13.99 | 6.32-6.44 | VS |
| 16.16-16.41 | 5.39-5.48 | W-M |
| 16.36-16.61 | 5.33-5.41 | W-M |
| 21.34-21.58 | 4.11-4.16 | W-M |
| 21.66-21.91 | 4.05-4.10 | M-S |
| 24.04-24.32 | 3.66-3.70 | W-M. |

In another aspect, the present application provides a method for preparing an aluminophosphate molecular sieve, comprising the steps of:

i) providing an aluminophosphate molecular sieve precursor, wherein the precursor has an X-ray diffraction pattern exhibiting a relative intensity profile as shown in the following table:

| 2 theta (°) | Interplanar spacing (Å) | Relative intensity ($I/I_0$) × 100 |
|---|---|---|
| 8.20-8.38 | 10.54-10.77 | S-VS |
| 13.40-13.61 | 6.50-6.60 | M-S |
| 15.81-15.99 | 5.54-5.60 | S-VS |
| 16.75-16.97 | 5.22-5.28 | W-M |
| 20.82-21.09 | 4.21-4.26 | S-VS |
| 22.31-22.52 | 3.94-3.98 | S-VS |
| 23.49-23.68 | 3.75-3.78 | M, | and ii) calcining the aluminophosphate molecular sieve precursor to obtain the aluminophosphate molecular sieve.

Preferably, the step i) further comprises:

ia) mixing an aluminum source, a phosphorus source, an organic material R and water at a molar ratio of the aluminum source (calculated as $Al_2O_3$): the phosphorus source (calculated as $P_2O_5$):R:$H_2O$ of about 1:(1.0-3.0):(1.5-6.0):(50-500) to obtain a synthetic mother liquor; and ib) subjecting the synthetic mother liquor to crystallization to obtain the molecular sieve precursor, wherein the organic material R is an ammonium hydroxide having the following formula:

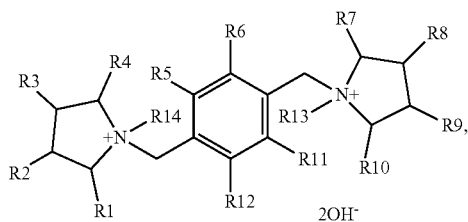

wherein the groups R1-R12, which may be identical or different from each other, are independently selected from H and $C_{1-6}$ alkyl groups, preferably from H and $C_{1-3}$ alkyl groups, more preferably H; and the groups R13 and R14, which may be identical or different from each other, are independently selected from $C_{1-6}$ alkyl groups, preferably $C_{1-3}$ alkyl groups, more preferably methyl.

In yet another aspect, the present application provides an aluminophosphate molecular sieve obtained by the method as described hereinabove.

In yet another aspect, the present application provides a molecular sieve composition comprising an aluminophosphate molecular sieve according to the present application or an aluminophosphate molecular sieve obtained by the method according to the present application, and a binder.

In yet another aspect, the present application provides the use of a molecular sieve according to the present application, a molecular sieve obtained by the method according to the present application, or a molecular sieve composition according to the present application as an adsorbent, a catalyst, or a catalyst carrier.

The aluminophosphate molecular sieve according to the present application has an open framework, so that the aluminophosphate molecular sieve can accommodate guest molecules. For example, the aluminophosphate molecular sieve can be used as an adsorbent of small organic molecules and water molecules, or used as a catalyst carrier for loading metals or metal oxides, such as copper oxide and the like, and used as a catalyst for treating tail gases containing nitrogen oxides.

Figure 1:
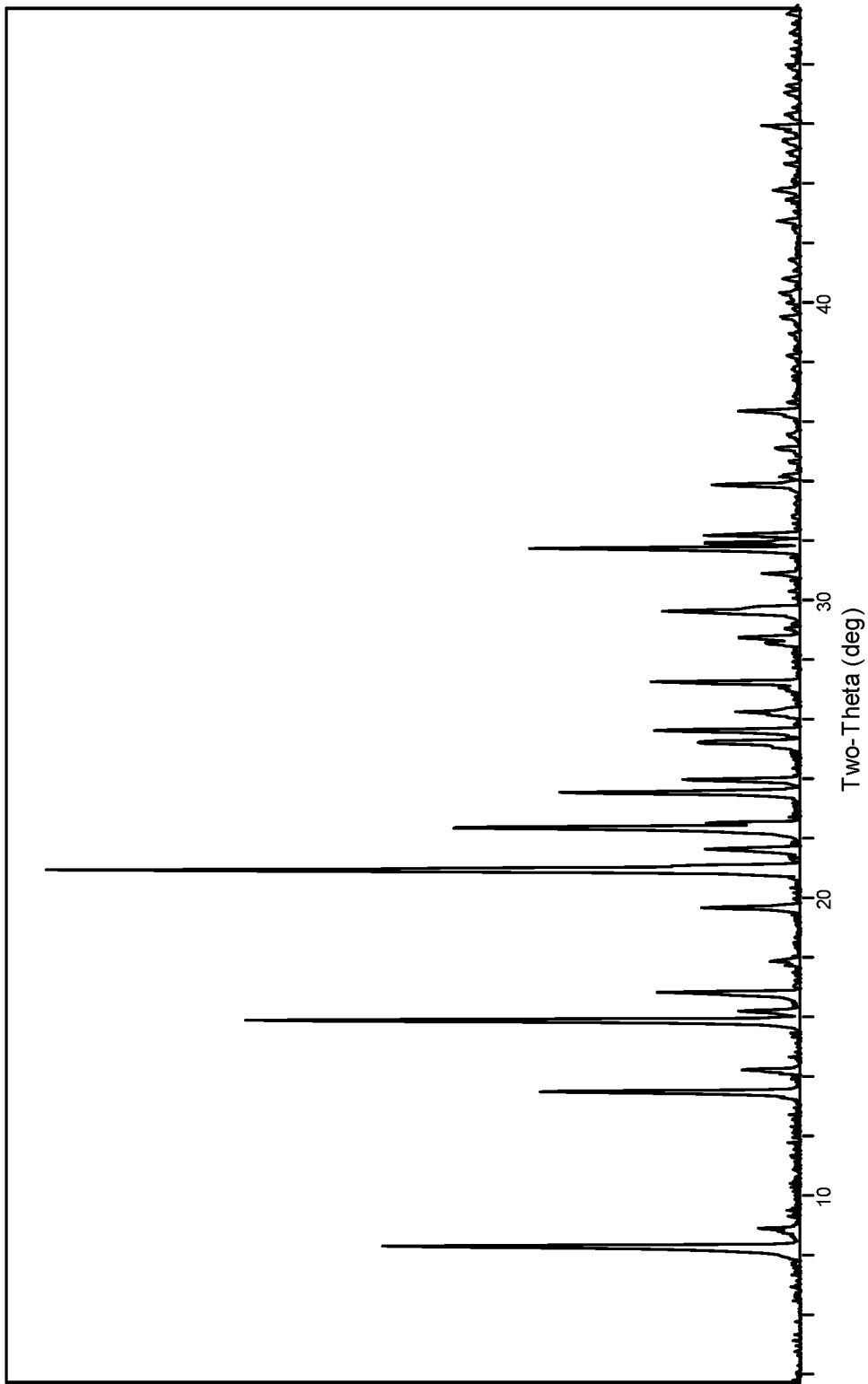
FIG. 1 shows an XRD pattern of the aluminophosphate molecular sieve precursor obtained in Example 1.

The present application will be further illustrated with reference to the examples hereinbelow, which are not intended to be limiting.

DETAILED DESCRIPTION OF THE INVENTION

Embodiments of the present application will be described in detail hereinafter, but it should be noted that the scope of the present application is not intended to be limited by the embodiments, but is defined by the appended claims.

All publications, patent applications, patents, and other references mentioned herein are hereby incorporated by reference in their entireties. Unless defined otherwise, all technical and scientific terms used herein have the same meaning as commonly understood by one of ordinary skill in the art. In case of conflict, the definitions provided herein will control.

When materials, substances, methods, steps, devices, components, or the like are described herein as being "well-known to one of ordinary skill in the art", "prior art", or the like, they are intended to cover those commonly used in the art at the time of filing, and those that are not commonly used at the present time but will become known in the art as being useful for a similar purpose.

In the context of the present application, the term "ratio of P to Al" or "molar ratio of P to Al" refers to the molar ratio of phosphorus calculated as $P_2O_5$ to aluminum calculated as $Al_2O_3$.

In the context of the present application, the term "specific surface area" refers to the total area of a sample per unit mass, including the internal and external surface areas. Non-porous samples, such as portland cement, some clay mineral particles, etc., have only an external surface area; porous samples, such as asbestos fibers, diatomaceous earth, molecular sieves, and the like, have both an external surface area and an internal surface area. The surface area of pores having a pore diameter of less than 2 nm in porous samples is referred to as the internal surface area, the surface area excluding the internal surface area is referred to as the external surface area, and the external surface area per unit mass of the sample is referred to as the external specific surface area.

In the context of the present application, the term "pore volume" refers to the volume of pores per unit mass of the molecular sieve. The term "total pore volume" refers to the volume of all pores (typically only including pores with a pore diameter of less than 50 nm) per mass of the molecular sieve. The term "micropore volume" refers to the volume of all micropores (typically including pores having a pore diameter of less than 2 nm) per unit mass of the molecular sieve.

In the context of the present application, the schematic chemical composition of the molecular sieve/molecular sieve precursor refers to the chemical composition of the framework of the molecular sieve/molecular sieve precursor, and the chemical composition only schematically shows the molar ratio between elements such as phosphorus (calculated as $P_2O_5$) and aluminum (calculated as $Al_2O_3$) in the framework of the molecular sieve/molecular sieve precursor, while the exact form of each element is not strictly limited. Generally, the schematic chemical composition can be determined by an inductively coupled plasma-atomic emission spectroscopy (ICP) method.

In the context of the present application, the structure of a molecular sieve is determined in accordance with the X-ray diffraction (XRD) pattern determined using an X-ray powder diffractometer, with a Cu-Kα radiation source, Kα1 wavelength (λ=1.5405980 angstrom (Å)), Kα2 rays being removed using a monochromator.

In the context of the present application, in the XRD data of the molecular sieve, W, M, S, VS, W-M, M-S and S-VS, etc. represent the relative intensity $I/I_0$ of the corresponding diffraction peak with respect to the strongest diffraction peak (i.e., the diffraction peak with the largest area) calculated based on the diffraction peak areas, wherein I represents the peak area of the corresponding diffraction peak and $I_0$ represents the peak area of the strongest diffraction peak, W means weak, M means medium, S means strong, VS means very strong, W-M means from weak to medium, M-S means from medium to strong, and S-VS means from strong to very strong. Such expressions are well known to those skilled in the art. Generally, W represents less than 20; M represents 20-40; S represents 40-60; VS represents greater than 60, W-M represents less than 40, M-S represents 20-60, and S-VS represents greater than 40.

In the context of the present application, the terms "after calcination", "calcined form" or "calcined molecular sieve" refer to the state of the molecular sieve after calcination. The state after calcination may be, for example, a state of the molecular sieve in which the organic materials (particularly, organic templates) and water that may be present in the pores of the as-synthesized molecular sieve have been further removed by calcination.

It should be noted that two or more of the aspects (or embodiments) disclosed herein can be combined with one another in any combination, and the technical solution thus obtained (e.g., a method or system) is included as part of the original disclosure, and is within the scope of the present application.

Unless otherwise indicated, all percentages, parts, ratios, etc. mentioned in the present application are calculated on a molar basis, unless the calculation on a molar basis is in conflict with conventional understanding of those skilled in the art.

In a first aspect, the present application provides an aluminophosphate molecular sieve having a schematic chemical composition of $Al_2O_3 \cdot nP_2O_5$, wherein n represents the mole ratio of P to Al and is in a range of about 0.8 to about 1.2, wherein the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 16.16-16.41 | 5.39-5.48 | W-M |
| 16.36-16.61 | 5.33-5.41 | W-M |
| 21.34-21.58 | 4.11-4.16 | W-M |
| 21.66-21.91 | 4.05-4.10 | M-S |
| 24.04-24.32 | 3.66-3.70 | W-M. |

In a preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M. |

In a further preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 17.17-17.42 | 5.08-5.16 | W |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M |
| 27.85-28.12 | 3.17-3.20 | W-M |
| 28.18-28.43 | 3.13-3.16 | W |
| 29.40-29.66 | 3.01-3.03 | M. |

In some preferred embodiments, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | 60.0-86.1 |
| 13.73-13.99 | 6.32-6.44 | 100 |
| 16.16-16.41 | 5.39-5.48 | 11.6-31.3 |
| 16.36-16.61 | 5.33-5.41 | 20.7-35.6 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4. |

In a further preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | 60.0-86.1 |
| 13.73-13.99 | 6.32-6.44 | 100 |
| 13.90-14.20 | 6.23-6.36 | 21.4-25.4 |
| 16.16-16.41 | 5.39-5.48 | 11.6-31.3 |
| 16.36-16.61 | 5.33-5.41 | 20.7-35.6 |
| 19.66-19.91 | 4.45-4.51 | 7.5-8.7 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4 |
| 24.41-24.65 | 3.61-3.64 | 16.2-19.8 |
| 25.71-25.96 | 3.43-3.46 | 20.8-25.0. |

In a still further preferred embodiment, the molecular sieve has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.60 | 10.27-10.77 | 60.0-86.1 |
| 13.73-13.99 | 6.32-6.44 | 100 |
| 13.90-4.20 | 6.23-6.36 | 21.4-25.4 |
| 16.16-16.41 | 5.39-5.48 | 11.6-31.3 |
| 16.36-16.61 | 5.33-5.41 | 20.7-35.6 |
| 17.17-17.42 | 5.08-5.16 | 3.3-6.5 |
| 19.66-19.91 | 4.45-4.51 | 7.5-8.7 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4 |
| 24.41-24.65 | 3.61-3.64 | 16.2-19.8 |
| 25.71-25.96 | 3.43-3.46 | 20.8-25.0 |
| 27.85-28.12 | 3.17-3.20 | 15.8-20.2 |
| 28.18-28.43 | 3.13-3.16 | 8.6-11.7 |
| 29.40-29.66 | 3.01-3.03 | 25.3-29.1. |

In a preferred embodiment, the aluminophosphate molecular sieve has a specific surface area of about 150-500 m²/g, preferably about 200-400 m²/g; and a micropore volume of about 0.09-0.25 ml/g, preferably about 0.10-0.20 ml/g.

In a second aspect, the present application provides a method for preparing an aluminophosphate molecular sieve, comprising the steps of:

i) providing an aluminophosphate molecular sieve precursor, wherein the precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | S-VS |
| 13.40-13.61 | 6.50-6.60 | M-S |
| 15.81-15.99 | 5.54-5.60 | S-VS |
| 16.75-16.97 | 5.22-5.28 | W-M |
| 20.82-21.09 | 4.21-4.26 | S-VS |
| 22.31-22.52 | 3.94-3.98 | S-VS |
| 23.49-23.68 | 3.75-3.78 | M, | and ii) calcining the aluminophosphate molecular sieve precursor to obtain the aluminophosphate molecular sieve.

In a preferred embodiment, the molecular sieve precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | S-VS |
| 13.40-13.61 | 6.50-6.60 | M-S |
| 15.81-15.99 | 5.54-5.60 | S-VS |
| 16.75-16.97 | 5.22-5.28 | W-M |
| 19.59-19.86 | 4.46-4.53 | W |
| 20.82-21.09 | 4.21-4.26 | S-VS |
| 22.31-22.52 | 3.94-3.98 | S-VS |
| 23.49-23.68 | 3.75-3.78 | M |
| 23.88-24.16 | 3.65-3.72 | W-M |
| 25.15-25.42 | 3.50-3.54 | W-M |
| 25.54-25.82 | 3.45-3.48 | W-M |
| 27.16-27.44 | 3.25-3.28 | W-M |
| 29.54-29.82 | 2.99-3.02 | W-M. |

In a further preferred embodiment, the molecular sieve precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | S-VS |
| 8.80-9.06 | 9.75-10.04 | W |
| 13.40-13.61 | 6.50-6.60 | M-S |
| 14.13-14.39 | 6.15-6.26 | W |
| 15.81-15.99 | 5.54-5.60 | S-VS |
| 16.75-16.97 | 5.22-5.28 | W-M |
| 19.59-19.86 | 4.46-4.53 | W |
| 20.82-21.09 | 4.21-4.26 | S-VS |
| 21.54-21.84 | 4.06-4.12 | W |
| 22.31-22.52 | 3.94-3.98 | S-VS |
| 23.49-23.68 | 3.75-3.78 | M |
| 23.88-24.16 | 3.65-3.72 | W-M |
| 25.15-25.42 | 3.50-3.54 | W-M |
| 25.54-25.82 | 3.45-3.48 | W-M |
| 26.20-26.41 | 3.37-3.40 | W |
| 27.16-27.44 | 3.25-3.28 | W-M |
| 28.66-28.90 | 3.08-3.11 | W |
| 29.54-29.82 | 2.99-3.02 | W-M. |

In some preferred embodiments, the molecular sieve precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | 40-60 |
| 13.40-13.61 | 6.50-6.60 | 23-39 |
| 15.81-15.99 | 5.54-5.60 | 66-85 |
| 16.75-16.97 | 5.22-5.28 | 18-36 |
| 20.82-21.09 | 4.21-4.26 | 100 |
| 22.31-22.52 | 3.94-3.98 | 65-85 |
| 23.49-23.68 | 3.75-3.78 | 25-38. |

In a further preferred embodiment, the molecular sieve precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | 40-60 |
| 13.40-13.61 | 6.50-6.60 | 23-39 |
| 15.81-15.99 | 5.54-5.60 | 66-85 |
| 16.75-16.97 | 5.22-5.28 | 18-36 |
| 19.59-19.86 | 4.46-4.53 | 6-17 |
| 20.82-21.09 | 4.21-4.26 | 100 |
| 22.31-22.52 | 3.94-3.98 | 65-85 |
| 23.49-23.68 | 3.75-3.78 | 25-38 |
| 23.88-24.16 | 3.65-3.72 | 10-20 |
| 25.15-25.42 | 3.50-3.54 | 16-32 |
| 25.54-25.82 | 3.45-3.48 | 12-30 |
| 27.16-27.44 | 3.25-3.28 | 15-35 |
| 29.54-29.82 | 2.99-3.02 | 15-35. |

In a still further preferred embodiment, the molecular sieve precursor has an X-ray diffraction pattern exhibiting a relative intensity profile as shown in the following table:

| 2 theta (°) | Interplanar spacing (Å) | Relative intensity ($I/I_0$) × 100 |
| --- | --- | --- |
| 8.20-8.38 | 10.54-10.77 | 40-60- |
| 8.80-9.06 | 9.75-10.04 | 8-18 |
| 13.40-13.61 | 6.50-6.60 | 23-39 |
| 14.13-14.39 | 6.15-6.26 | 8-18 |
| 15.81-15.99 | 5.54-5.60 | 66-85 |
| 16.75-16.97 | 5.22-5.28 | 18-36 |
| 19.59-19.86 | 4.46-4.53 | 6-17 |

| 2 theta (°) | Interplanar spacing (Å) | Relative intensity $(I/I_0) \times 100$ |
|---|---|---|
| 20.82-21.09 | 4.21-4.26 | 100 |
| 21.54-21.84 | 4.06-4.12 | 5-16 |
| 22.31-22.52 | 3.94-3.98 | 65-85 |
| 23.49-23.68 | 3.75-3.78 | 25-38 |
| 23.88-24.16 | 3.65-3.72 | 10-20 |
| 25.15-25.42 | 3.50-3.54 | 16-32 |
| 25.54-25.82 | 3.45-3.48 | 12-30 |
| 26.20-26.41 | 3.37-3.40 | 10-18 |
| 27.16-27.44 | 3.25-3.28 | 15-35 |
| 28.66-28.90 | 3.08-3.11 | 8-15 |
| 29.54-29.82 | 2.99-3.02 | 15-35. |

In some preferred embodiments, the framework of the aluminophosphate molecular sieve precursor has a schematic chemical composition of $Al_2O_3 \cdot nP_2O_5$, expressed on a molar basis, wherein n represents a phosphorus to aluminum molar ratio, and is in a range of about 0.8 to about 1.2.

In a preferred embodiment, the step i) further comprises:

ia) mixing an aluminum source, a phosphorus source, an organic material R and water at a molar ratio of the aluminum source (calculated as $Al_2O_3$): the phosphorus source (calculated as $P_2O_5$):R:$H_2O$ of about 1:(1.0-3.0):(1.5-6.0):(50-500) to obtain a synthetic mother liquor; and ib) subjecting the synthetic mother liquor to crystallization to obtain the molecular sieve precursor;

wherein the organic material R is an ammonium hydroxide having the following formula:

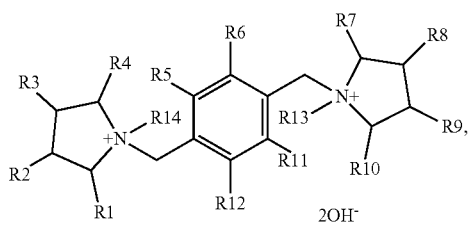

wherein the groups R1-R12, which may be identical or different from each other, are independently selected from H and $C_{1-6}$ alkyl groups, preferably from H and $C_{1-3}$ alkyl groups, more preferably H; and the groups R13 and R14, which may be identical or different from each other, are independently selected from $C_{1-6}$ alkyl groups, preferably $C_{1-3}$ alkyl groups, more preferably methyl.

In the method according to the present application, the aluminum source is not particularly limited and may be, for example, those commonly used for producing aluminum-containing molecular sieves. In a preferred embodiment, the aluminum source is one or more selected from the group consisting of pseudo-boehmite, aluminum isopropoxide, aluminum sol, aluminum hydroxide, aluminum sulfate, aluminum chloride and aluminum oxide, preferably selected from the group consisting of pseudo-boehmite and aluminum isopropoxide.

In the method according to the present application, the phosphorus source is not particularly limited, and may be, for example, those commonly used for producing phosphorus-containing molecular sieves. In a preferred embodiment, the phosphorus source is one or more selected from the group consisting of phosphoric acid, orthophosphorous acid and phosphorus pentoxide, preferably phosphoric acid.

In a preferred embodiment, in step ia) the aluminum source, the phosphorus source, the organic material R and water are mixed at a molar ratio of the aluminum source (calculated as $Al_2O_3$): the phosphorus source (calculated as $P_2O_5$):R:$H_2O$ of about 1:(1.0-2.0):(2.5-4.8):(100-300).

In a particularly preferred embodiment, the organic material R is 1,1-[1,4-phenylenebis(methylene)]bis-1-methylpyrrolidinium dihydroxide having the following formula:

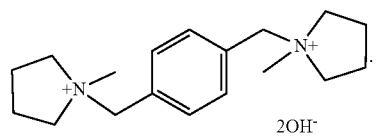 [SMILES: C[N+]1(Cc2ccc(C[N+]3(C)CCCC3)cc2)CCCC1]

In a preferred embodiment, step ib) is carried out under the following conditions: a sealed reaction vessel, a crystallization temperature of about 130-200° C., and a crystallization time of about 24-150 hours. Further preferably, the crystallization temperature is about 145-185° C. and the crystallization time is about 48-120 hours.

Further preferably, the step ib) further comprises washing and drying the resulting aluminophosphate molecular sieve precursor. The washing and drying procedures are not particularly limited and may be performed in a conventional manner. For example, the washing can be performed with deionized water, and a method such as suction filtration or centrifugal separation can be adopted, until the spent washing solution is nearly neutral; and the drying may be, for example, drying in an oven at about 100-250° C. for about 1-48 hours.

In some preferred embodiments, in the molecular sieve precursor obtained in step ib), the molar ratio of phosphorus, calculated as $P_2O_5$, to aluminum, calculated as $Al_2O_3$, i.e. ($P_2O_5/Al_2O_3$), is in a range of about 0.8 to about 1.2, and the content of the organic material is in a range of about 8% to about 40% by weight of the molecular sieve precursor.

The aluminophosphate molecular sieve precursor obtained in step ib) has a stable crystal structure, and can be calcined using conventional methods, which is not particularly limited in the present application. For example, the calcination may be performed at about 500-750° C. under an air atmosphere, and the calcination time may be, for example, about 1-10 hours. Particularly, the calcination may be performed at about 550° C. for about 6 hours under an air atmosphere. Depending on the calcination conditions, the resulting aluminophosphate molecular sieve may contain a certain amount of residual carbonaceous material, but such residual carbonaceous material is not taken into account in the chemical composition of the molecular sieve.

In a preferred embodiment, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 16.16-16.41 | 5.39-5.48 | W-M |
| 16.36-16.61 | 5.33-5.41 | W-M |
| 21.34-21.58 | 4.11-4.16 | W-M |

-continued

| 2 theta (°) | Interplanar spacing (Å) | Relative intensity $(I/I_0) \times 100$ |
|---|---|---|
| 21.66-21.91 | 4.05-4.10 | M-S |
| 24.04-24.32 | 3.66-3.70 | W-M. |

In a further preferred embodiment, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M. |

In a still further preferred embodiment, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 17.17-17.42 | 5.08-5.16 | W |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M |
| 27.85-28.12 | 3.17-3.20 | W-M |
| 28.18-28.43 | 3.13-3.16 | W |
| 29.40-29.66 | 3.01-3.03 | M. |

In some preferred embodiments, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | 60.0-86.1 |
| 13.73-13.99 | 6.32-6.44 | 100 |
| 16.16-16.41 | 5.39-5.48 | 11.6-31.3 |
| 16.36-16.61 | 5.33-5.41 | 20.7-35.6 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4. |

In a further preferred embodiment, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | 60.0-86.1 |
| 13.73-13.99 | 6.32-6.44 | 100 |
| 13.90-14.20 | 6.23-6.36 | 21.4-25.4 |
| 16.16-16.41 | 5.39-5.48 | 11.6-31.3 |
| 16.36-16.61 | 5.33-5.41 | 20.7-35.6 |
| 19.66-19.91 | 4.45-4.51 | 7.5-8.7 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4 |
| 24.41-24.65 | 3.61-3.64 | 16.2-19.8 |
| 25.71-25.96 | 3.43-3.46 | 20.8-25.0. |

In a still further preferred embodiment, the aluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.20-8.60 | 10.27-10.77 | 60.0-86.1 |
| 13.73-13.99 | 6.32-6.44 | 100 |
| 13.90-4.20 | 6.23-6.36 | 21.4-25.4 |
| 16.16-16.41 | 5.39-5.48 | 11.6-31.3 |
| 16.36-16.61 | 5.33-5.41 | 20.7-35.6 |
| 17.17-17.42 | 5.08-5.16 | 3.3-6.5 |
| 19.66-19.91 | 4.45-4.51 | 7.5-8.7 |
| 21.34-21.58 | 4.11-4.16 | 14.4-37.7 |
| 21.66-21.91 | 4.05-4.10 | 31.0-45.4 |
| 24.04-24.32 | 3.66-3.70 | 14.9-38.4 |
| 24.41-24.65 | 3.61-3.64 | 16.2-19.8 |
| 25.71-25.96 | 3.43-3.46 | 20.8-25.0 |
| 27.85-28.12 | 3.17-3.20 | 15.8-20.2 |
| 28.18-28.43 | 3.13-3.16 | 8.6-11.7 |
| 29.40-29.66 | 3.01-3.03 | 25.3-29.1. |

In the method according to the present application, under the combined effect of the aluminum source, the phosphorus source and the organic material R, the aluminophosphate molecular sieve according to the present application with the specific X-ray diffraction pattern can be directionally prepared by controlling the feeding ratio of the starting materials.

In a third aspect, the present application provides an aluminophosphate molecular sieve obtained by the method according to the present application.

In a fourth aspect, the present application provides a molecular sieve composition comprising an aluminophosphate molecular sieve according to the present application or an aluminophosphate molecular sieve obtained by the method according to the present application, and a binder.

The molecular sieve composition may be in any physical form, such as powders, granules, or molded articles (e.g., bars, trilobes, etc.). These physical forms can be obtained in any manner commonly known in the art and are not particularly limited.

In the present application, the binder is not particularly limited, and for example, those commonly used for preparing adsorbents or catalysts, including but not limited to clay, carclazyte, silicon oxide, silica gel, alumina, zinc oxide or a mixture thereof, may be used.

In a fifth aspect, the present application provides the use of an aluminophosphate molecular sieve according to the present application, an aluminophosphate molecular sieve obtained by the method according to the present application, or a molecular sieve composition according to the present application as an adsorbent, a catalyst, or a catalyst carrier.

As examples of the adsorbent, those useful, for example, for removing water from an organic solvent, such as isopropyl alcohol, isobutyl alcohol and isobutyl ketone, containing a small amount of water, and for adsorbing and removing moisture from natural gas containing a small amount of moisture, may be mentioned As an example of the catalyst, a catalyst obtained, for example, by loading Cu onto an SCM-18 molecular sieve may be mentioned, which is useful for the catalytic decomposition of nitrogen oxides present in automobile exhaust gas.

In some preferred embodiments, the present application provides the following technical solutions:

Item 1, an SCM-18 molecular sieve having a chemical composition, excluding moisture, of $Al_2O_3:nP_2O_5$, expressed in molar ratio, wherein n is 1.0 to 3.0, and the molecular sieve has an X-ray diffraction pattern exhibiting a relative intensity profile shown in the following table:

| Interplanar spacing (Å) | Relative intensity $(I/I_0) \times 100$ |
|---|---|
| d = 10.46 ± 0.17 | 45-92 |
| d = 6.40 ± 0.12 | 100 |
| d = 6.35 ± 0.11 | 30-72 |
| d = 5.45 ± 0.09 | 10-35 |
| d = 5.39 ± 0.09 | 10-40 |
| d = 4.14 ± 0.05 | 30-70 |
| d = 4.11 ± 0.05 | 30-65 |
| d = 4.09 ± 0.05 | 33-67 |
| d = 3.69 ± 0.05 | 25-50 |
| d = 3.64 ± 0.05 | 10-36 |
| d = 3.46 ± 0.05 | 18-40 |
| d = 3.03 ± 0.05 | 16-37 |
| d = 2.75 ± 0.05 | 10-30. |

Item 2, a method for preparing the SCM-18 molecular sieve of Item 1, comprising the steps of:

a) uniformly mixing an aluminum source, a phosphorus source, an organic material R and water at a weight ratio of $Al_2O_3$: (1.0-3.0) $P_2O_5$: (1.5-6.0) R: (50-500) $H_2O$ to obtain a synthetic mother liquor;

b) subjecting the synthetic mother liquor to crystallization in a sealed reaction vessel;

c) washing and drying the product obtained in the step b) to obtain a precursor of the SCM-18 molecular sieve; and d) calcining the precursor of the SCM-18 molecular sieve to obtain the SCM-18 molecular sieve.

Item 3, the method for preparing the SCM-18 molecular sieve according to Item 2, wherein the aluminum source, the phosphorus source, the organic material R and water are mixed uniformly at a molar ratio of $Al_2O_3$: (1.0-2.0) $P_2O_5$: (2.5-4.8) R: (100-300) $H_2O$ to obtain the synthetic mother liquor.

Item 4. the method for preparing the SCM-18 molecular sieve according to Item 2, wherein the organic material R is 1,1-[1,4-phenylenebis(methylene)]bis-1-methylpyrrolidinium dihydroxide.

Item 5, the method for preparing the SCM-18 molecular sieve according to Item 2, wherein the crystallization temperature is 130° C. to 200° C. and the crystallization time is 24 to 150 hours.

Item 6, the method for preparing the SCM-18 molecular sieve according to Item 2, wherein the aluminum source is at least one of pseudo-boehmite, aluminum isopropoxide, aluminum sol and aluminum oxide; the phosphorus source is one or more selected from the group consisting of phosphoric acid, orthophosphorous acid or phosphorus pentoxide.

Item 7, the method for preparing the SCM-18 molecular sieve according to Item 2, wherein the precursor of the SCM-18 molecular sieve has an X-ray diffraction pattern as follows:

| Interplanar spacing (Å) | Relative intensity $(I/I_0) \times 100$ |
|---|---|
| d = 10.64 ± 0.17 | 40-60 |
| d = 6.56 ± 0.11 | 23-39 |
| d = 5.58 ± 0.09 | 66-85 |
| d = 5.27 ± 0.06 | 18-36 |
| d = 4.24 ± 0.05 | 100 |
| d = 3.98 ± 0.05 | 65-85 |
| d = 3.78 ± 0.05 | 25-38 |
| d = 3.71 ± 0.05 | 10-20 |
| d = 3.53 ± 0.05 | 16-32 |
| d = 3.48 ± 0.05 | 12-30 |
| d = 3.27 ± 0.05 | 15-35 |
| d = 3.01 ± 0.05 | 15-35. |

Item 8, the method for preparing the SCM-18 molecular sieve according to Item 2, wherein the precursor of the SCM-18 molecular sieve has a chemical composition, excluding moisture, of m organic components: $Al_2O_3:P_2O_5$, wherein $0.03 \leq m \leq 0.3$.

Item 9, a molecular sieve composition comprising a molecular sieve of Item 1 or a molecular sieve obtained by the method according to any one of Items 2-8, and a binder.

Item 10, use of a molecular sieve of Item 1, a molecular sieve obtained by the method according to any one of Items 2-8, or a molecular sieve composition of Item 9 as an adsorbent or a catalyst.

EXAMPLES

The present application will be further illustrated with reference to the following examples, which are not intended to be limiting.

Starting Materials

In the following examples, the starting material 1,1-[1,4-phenylenebis(methylene)]bis-1-methylpyrrolidinium dihydroxide used is commercially available from SACHEM company, chemically pure with a mass concentration of 20.75% (aqueous solution); the pseudo-boehmite is commercially available from Shandong Ying Lang Chemicals Co., Ltd., chemical pure with a content of 72% by weight calculated as $Al_2O_3$; the phosphoric acid is commercially available from Sinopharm Chemical Reagent Co., Ltd., analytically pure with a mass concentration of 85% (aqueous solution); the aluminum isopropoxide is commercially available from Sinopharm Chemical Reagent Co., Ltd., chemically pure with a content of 24.7% by weight calculated as $Al_2O_3$.

Unless otherwise stated, chemical reagents used in the following examples are commercially available chemically pure products.

Analytical Instrument and Method

In the examples, the XRD pattern of the molecular sieve was determined using a PANalytical X'Pert PRO X-ray powder diffractometer, with a Cu-Kα radiation source, Kα1 wavelength λ=1.5405980 angstrom (A), Kα2 rays being removed using a Ge (111) monochromator, operating current and voltage of 40 milliamps and 40 kilovolts, respectively, a scanning step size of 2 theta=0.02°, and a scanning rate of 6°/min.

The chemical composition of the molecular sieve was determined by inductively coupled plasma-atomic emission spectroscopy (ICP) using Model S-35 from Kontron, solid molecular sieve sample was dissolved with HF to make a solution before testing.

The specific surface area and pore volume of the molecular sieve were determined by the $N_2$ physical adsorption-desorption method using QUADRASORB evo Gas Sorption Surface Area and Pore Size Analyzer from Quantachrome, at a measuring temperature of 77K, and before the measurement, the sample was vacuum pretreated at 573K for 6 h. The specific surface area was calculated using the BET equation and the pore volume was calculated by the t-plot method.

The content of the organic material in the molecular sieve precursor was determined by the thermogravimetric analysis method using STA449F3 thermogravimetric analyzer from NETZSCH, with an air flow of 30 ml/min, and a heating rate of 10° C./min, wherein the weight loss percentage between 250° C. and 550° C. was taken as the content of the organic material.

Example 1

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite was added thereto while stirring, and then 2.30 g of an 85% phosphoric acid solution was slowly added dropwise and stirred uniformly to obtain a synthetic mother liquor having the following composition expressed in molar ratio (wherein $Al_2O_3$ represents the aluminum source calculated as $Al_2O_3$, $P_2O_5$ represents the phosphorus source calculated as $P_2O_5$, the same below):

1.0$Al_2O_3$:2.4$P_2O_5$:4.8R:190$H_2O$

Figure 2:
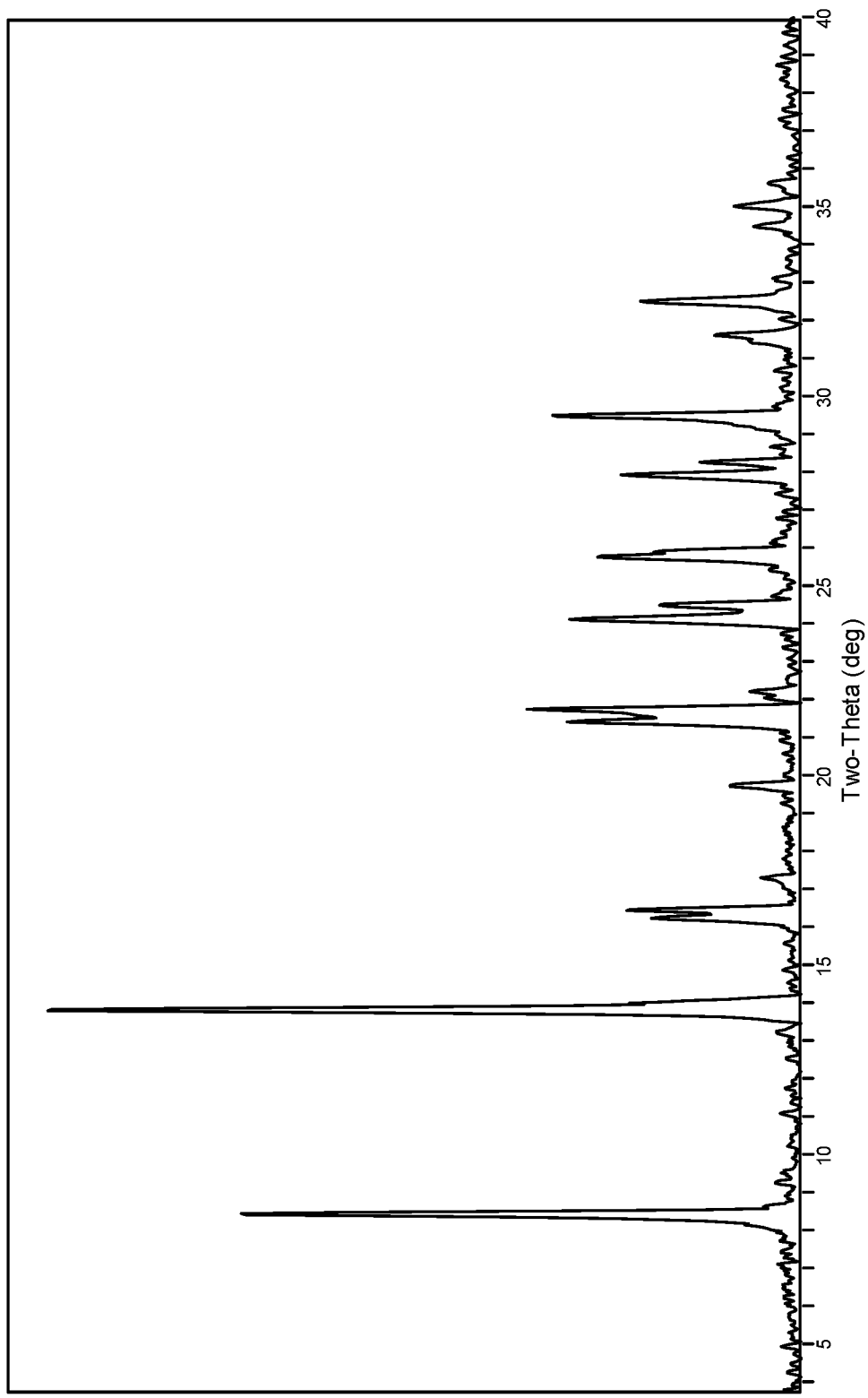
FIG. 2 shows an XRD pattern of the aluminophosphate molecular sieve obtained in Example 1.

The above synthetic mother liquor was crystallized in a sealed reaction vessel at a crystallization temperature of 175° C. for 84 hours, the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, and a content by weight of the organic material of 15.3%. It had the XRD pattern shown in FIG. 1 and the XRD data shown in Table 1A. The aluminophosphate molecular sieve precursor was calcined at 550° C. for 5 hours to obtain an aluminophosphate molecular sieve, the product molecular sieve had a schematic chemical composition of $Al_2O_3$·1.0 $P_2O_5$ as determined by inductively coupled plasma-atomic emission spectroscopy (ICP), a specific surface area of 394 m²/g, a micropore volume of 0.17 ml/g, the XRD pattern as shown in FIG. 2, and the corresponding XRD data as shown in Table 1B.

TABLE 1A

XRD data of the aluminophosphate molecular sieve precursor obtained in Example 1

| 2 theta (°) | Interplanar spacing (Å) | Relative intensity $(I/I_0) \times 100$ |
|---|---|---|
| 8.38 | 10.56 | 57.6 |
| 8.96 | 9.88 | 4.8 |
| 13.58 | 6.54 | 41.3 |
| 14.30 | 6.21 | 9.6 |
| 15.98 | 5.56 | 76.5 |
| 16.90 | 5.26 | 23.3 |
| 19.76 | 4.50 | 13.7 |
| 21.02 | 4.23 | 100 |
| 21.74 | 4.10 | 14.2 |
| 22.44 | 3.97 | 66.8 |

TABLE 1A-continued

XRD data of the aluminophosphate molecular sieve precursor obtained in Example 1

| 2 theta (°) | Interplanar spacing (Å) | Relative intensity $(I/I_0) \times 100$ |
|---|---|---|
| 23.62 | 3.77 | 33.7 |
| 24.05 | 3.71 | 16.0 |
| 25.32 | 3.52 | 24.2 |
| 25.72 | 3.47 | 24.1 |
| 26.32 | 3.39 | 9.7 |
| 27.35 | 3.27 | 23.1 |
| 28.83 | 3.10 | 11.6 |
| 29.72 | 3.01 | 27.2 |

TABLE 1B

XRD data of the aluminophosphate molecular sieve obtained in Example 1

| 2 theta (°) | Interplanar spacing (Å) | Relative intensity $(I/I_0) \times 100$ |
|---|---|---|
| 8.47 | 10.43 | 76.9 |
| 13.85 | 6.39 | 100 |
| 14.00 | 6.32 | 20.8 |
| 16.29 | 5.44 | 17.9 |
| 16.48 | 5.37 | 21.8 |
| 17.27 | 5.13 | 3.3 |
| 19.77 | 4.49 | 7.5 |
| 21.45 | 4.14 | 24.6 |
| 21.77 | 4.08 | 31.0 |
| 24.18 | 3.68 | 24.8 |
| 24.51 | 3.63 | 16.2 |
| 25.82 | 3.45 | 20.8 |
| 28.0 | 3.19 | 18.0 |
| 28.29 | 3.15 | 8.4 |
| 29.52 | 3.02 | 27.7 |

Example 2

8.6 g of 20.75% 1,1-[1,4-phenylenebis(methylene)]bis-1-methylpyrrolidinium dihydroxide (R) solution was weighed, 0.698 g of pseudo-boehmite was added thereto while stirring, and then 2.30 g of 85% phosphoric acid solution was slowly added dropwise, and stirred uniformly to obtain a synthetic mother liquor having the following composition expressed in molar ratio:

1.0$Al_2O_3$:2.4$P_2O_5$:1.5R:50$H_2O$

The above synthetic mother liquor was crystallized in a sealed reaction vessel at a crystallization temperature of 175° C. for 84 hours, the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, a content by weight of the organic material of 17.9%, and the XRD data as shown in Table 2A. The aluminophosphate molecular sieve precursor was calcined at 550° C. for 5 hours to obtain an aluminophosphate molecular sieve, the product molecular sieve had a schematic chemical composition as determined by inductively coupled plasma-atomic emission spectrometry (ICP) of $Al_2O_3$·1.0 $P_2O_5$, a specific surface area of 363 m²/g, a micropore volume of 0.16 ml/g, and the XRD data as shown in Table 2B.

TABLE 2A

XRD data of the aluminophosphate molecular sieve precursor obtained in Example 2

| 2 theta (°) | Interplanar spacing (Å) | Relative intensity ($I/I_0$) × 100 |
|---|---|---|
| 8.30 | 10.67 | 63.6 |
| 8.90 | 9.96 | 6.2 |
| 13.50 | 6.57 | 37.9 |
| 14.24 | 6.23 | 8.3 |
| 15.89 | 5.59 | 76.3 |
| 16.83 | 5.28 | 18.7 |
| 19.69 | 4.52 | 12.4 |
| 20.94 | 4.25 | 100 |
| 21.64 | 4.11 | 11.4 |
| 22.37 | 3.98 | 48.4 |
| 23.55 | 3.78 | 31.5 |
| 23.98 | 3.72 | 15.7 |
| 25.25 | 3.53 | 14.2 |
| 25.64 | 3.48 | 19.8 |
| 26.25 | 3.40 | 7.7 |
| 27.26 | 3.28 | 19.4 |
| 28.76 | 3.11 | 7.9 |
| 29.64 | 3.02 | 17.1 |

TABLE 2B

XRD data of the aluminophosphate molecular sieve obtained in Example 2

| 2 theta (°) | Interplanar spacing (Å) | Relative intensity ($I/I_0$) × 100 |
|---|---|---|
| 8.44 | 10.50 | 86.1 |
| 13.84 | 6.41 | 100 |
| 13.93 | 6.35 | 23.9 |
| 16.26 | 5.46 | 18.8 |
| 16.46 | 5.40 | 22.7 |
| 17.32 | 5.11 | 4.1 |
| 19.76 | 4.50 | 8.6 |
| 21.44 | 4.15 | 26.4 |
| 21.77 | 4.09 | 35.2 |
| 24.14 | 3.69 | 28.4 |
| 24.52 | 3.64 | 16.2 |
| 25.81 | 3.46 | 24.1 |
| 27.96 | 3.20 | 19.8 |
| 28.29 | 3.16 | 11.7 |
| 29.50 | 3.03 | 28.8 |

Example 3

34.5 g of 20.75% 1,1-[1,4-phenylenebis(methylene)]bis-1-methylpyrrolidinium dihydroxide (R) solution was weighed, 0.698 g of pseudo-boehmite was added thereto while stirring, and then 2.30 g of 85% phosphoric acid solution was slowly added dropwise, and stirred uniformly to obtain a synthetic mother liquor having the following composition expressed in molar ratio:

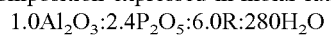
1.0$Al_2O_3$:2.4$P_2O_5$:6.0R:280$H_2O$

The synthetic mother liquor was crystallized in a sealed reaction vessel at a crystallization temperature of 175° C. for 84 hours, and the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a content by weight of the organic material of 14.4%, and the XRD data as shown in Table 3A. The aluminophosphate molecular sieve precursor was calcined at 550° C. for 5 hours to obtain an aluminophosphate molecular sieve, the product molecular sieve had a schematic chemical composition as determined by inductively coupled plasma-atomic emission spectrometry (ICP) of $Al_2O_3$·0.98 $P_2O_5$, a specific surface area of 410 m²/g, a micropore volume of 0.18 ml/g, and the XRD data as shown in Table 3B.

TABLE 3A

XRD data of the aluminophosphate molecular sieve precursor obtained in Example 3

| 2 theta (°) | Interplanar spacing (Å) | Relative intensity ($I/I_0$) × 100 |
|---|---|---|
| 8.34 | 10.59 | 41.3 |
| 8.93 | 9.89 | 11.2 |
| 13.55 | 6.53 | 20.4 |
| 14.28 | 6.20 | 11.4 |
| 15.95 | 5.55 | 60.0 |
| 16.88 | 5.25 | 33.3 |
| 19.75 | 4.49 | 11.7 |
| 21.00 | 4.23 | 67.2 |
| 21.70 | 4.09 | 12.8 |
| 22.41 | 3.96 | 100 |
| 23.60 | 3.77 | 20.4 |
| 24.03 | 3.70 | 11.0 |
| 25.28 | 3.52 | 35.2 |
| 25.69 | 3.46 | 16.7 |
| 26.29 | 3.39 | 9.9 |
| 27.32 | 3.26 | 12.0 |
| 28.81 | 3.10 | 13.4 |
| 29.70 | 3.00 | 22.3 |

TABLE 3B

XRD data of the aluminophosphate molecular sieve obtained in Example 3

| 2 theta (°) | Interplanar spacing (Å) | Relative intensity ($I/I_0$) × 100 |
|---|---|---|
| 8.47 | 10.46 | 76.0 |
| 13.85 | 6.40 | 100 |
| 6.34 | 13.95 | 21.4 |
| 16.27 | 5.46 | 16.6 |
| 16.49 | 5.39 | 23.1 |
| 17.29 | 5.14 | 3.6 |
| 19.78 | 4.50 | 8.1 |
| 21.45 | 4.15 | 24.4 |
| 21.77 | 4.09 | 32.0 |
| 24.18 | 3.69 | 25.2 |
| 24.52 | 3.64 | 17.0 |
| 25.82 | 3.46 | 20.8 |
| 27.98 | 3.20 | 18.8 |
| 28.30 | 3.16 | 8.6 |
| 29.53 | 3.03 | 29.1 |

Example 4

27.6 g of 20.75% 1,1-[1,4-phenylenebis(methylene)]bis-1-methylpyrrolidinium dihydroxide (R) solution was weighed, 0.698 g of pseudo-boehmite was added thereto while stirring, and then 2.30 g of 85% phosphoric acid solution was slowly added dropwise, and stirred uniformly to obtain a synthetic mother liquor having the following composition expressed in molar ratio:

1.0$Al_2O_3$:2.4$P_2O_5$:4.8R:190$H_2O$

The synthetic mother liquor was crystallized in a sealed reaction vessel at a crystallization temperature of 190° C. for 60 hours, and the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, a content by weight of the
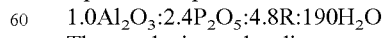

organic material of 20.2%, and the XRD data as shown in Table 4A. The aluminophosphate molecular sieve precursor was calcined at 550° C. for 5 hours to obtain an aluminophosphate molecular sieve, the product molecular sieve had a schematic chemical composition of $Al_2O_3 \cdot 1.0\ P_2O_5$ as determined by inductively coupled plasma-atomic emission spectroscopy (ICP), a specific surface area of 357 m²/g, a micropore volume of 0.15 ml/g, and the XRD data as shown in Table 4B.

TABLE 4A

XRD data of the aluminophosphate molecular sieve precursor obtained in Example 4

| 2 theta (°) | Interplanar spacing (Å) | Relative intensity $(I/I_0) \times 100$ |
|---|---|---|
| 8.33 | 10.61 | 53.1 |
| 8.91 | 9.92 | 10.4 |
| 13.52 | 6.54 | 26.1 |
| 14.25 | 6.21 | 10.6 |
| 15.92 | 5.56 | 61.5 |
| 16.86 | 5.25 | 32.9 |
| 19.73 | 4.50 | 14.0 |
| 20.97 | 4.23 | 76.5 |
| 21.70 | 4.09 | 15.4 |
| 22.41 | 3.96 | 100 |
| 23.57 | 3.77 | 26.6 |
| 24.00 | 3.70 | 13.9 |
| 25.29 | 3.52 | 33.1 |
| 25.68 | 3.47 | 20.0 |
| 26.28 | 3.39 | 10.8 |
| 27.29 | 3.26 | 15.7 |
| 28.80 | 3.10 | 10.2 |
| 29.69 | 3.01 | 23.8 |

TABLE 4B

XRD data of the aluminophosphate molecular sieve obtained in Example 4

| 2 theta (°) | Interplanar spacing (Å) | Relative intensity $(I/I_0) \times 100$ |
|---|---|---|
| 8.47 | 10.43 | 63.9 |
| 13.86 | 6.38 | 100 |
| 14.01 | 6.32 | 25.4 |
| 16.30 | 5.44 | 21.3 |
| 16.49 | 55.37 | 31.7 |
| 17.28 | 5.13 | 6.3 |
| 19.78 | 4.48 | 8.7 |
| 21.48 | 4.13 | 26.6 |
| 21.80 | 4.07 | 43.1 |
| 24.18 | 3.68 | 24.9 |
| 24.55 | 3.62 | 19.8 |
| 25.85 | 3.44 | 25.0 |
| 27.99 | 3.18 | 19.8 |
| 28.32 | 3.15 | 11.3 |
| 29.55 | 3.02 | 25.3 |

Example 5

27.6 g of 20.75% 1,1-[1,4-phenylenebis(methylene)]bis-1-methylpyrrolidinium dihydroxide (R) solution was weighed, 0.698 g of pseudo-boehmite was added thereto while stirring, and then 2.30 g of 85% phosphoric acid solution was slowly added dropwise, and stirred uniformly to obtain a synthetic mother liquor having the following composition expressed in molar ratio:
$1.0Al_2O_3:2.4P_2O_5:4.8R:190H_2O$ The above synthetic mother liquor was crystallized in a sealed reaction vessel at a crystallization temperature of 150° C. for 120 hours, the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.95, a content by weight of the organic material of 19.0%, and the XRD data as shown in Table 5A. The aluminophosphate molecular sieve precursor was calcined at 550° C. for 5 hours to obtain an aluminophosphate molecular sieve, and the product molecular sieve had a schematic chemical composition of $Al_2O_3 \cdot 0.95\ P_2O_5$ as determined by inductively coupled plasma-atomic emission spectroscopy (ICP), a specific surface area of 330 m²/g, a micropore volume of 0.15 ml/g, and the corresponding XRD data as shown in Table

TABLE 5A

XRD data of the aluminophosphate molecular sieve precursor obtained in Example 5

| 2 theta (°) | Interplanar spacing (Å) | Relative intensity $(I/I_0) \times 100$ |
|---|---|---|
| 8.30 | 10.64 | 65.7 |
| 8.89 | 9.93 | 5.4 |
| 13.50 | 6.55 | 37.1 |
| 14.24 | 6.22 | 7.7 |
| 15.89 | 5.57 | 77.8 |
| 16.82 | 5.26 | 19.1 |
| 19.68 | 4.51 | 12.7 |
| 20.94 | 4.24 | 100 |
| 21.64 | 4.10 | 11.8 |
| 22.37 | 3.97 | 48.4 |
| 23.54 | 3.78 | 31.4 |
| 23.98 | 3.71 | 15.2 |
| 25.24 | 3.52 | 14.7 |
| 25.64 | 3.47 | 18.3 |
| 26.241 | 3.39 | 7.6 |
| 27.26 | 3.27 | 19.1 |
| 28.75 | 3.10 | 7.3 |
| 29.63 | 3.01 | 17.3 |

TABLE 5B

XRD data of the aluminophosphate molecular sieve obtained in Example 5

| 2 theta (°) | Interplanar spacing (Å) | Relative intensity $(I/I_0) \times 100$ |
|---|---|---|
| 8.46 | 10.45 | 60.3 |
| 13.84 | 6.39 | 100 |
| 14.00 | 6.32 | 23.1 |
| 16.26 | 5.44 | 16.6 |
| 16.48 | 5.37 | 32.6 |
| 17.32 | 5.12 | 6.5 |
| 19.77 | 4.49 | 8.6 |
| 21.44 | 4.14 | 27.2 |
| 21.78 | 4.08 | 45.4 |
| 24.15 | 3.68 | 26.0 |
| 24.55 | 3.62 | 18.8 |
| 25.85 | 3.44 | 24.4 |
| 27.98 | 3.18 | 15.8 |
| 28.30 | 3.15 | 10.4 |
| 29.55 | 3.02 | 28.0 |

Example 6

27.6 g of 20.75% 1,1-[1,4-phenylenebis(methylene)]bis-1-methylpyrrolidinium dihydroxide (R) solution was weighed, 0.698 g of pseudo-boehmite was added thereto while stirring, 1.15 g of 85% phosphoric acid solution was then slowly added dropwise, and stirred uniformly to obtain a synthetic mother liquor having the following composition expressed in molar ratio:

$1.0Al_2O_3:1.2P_2O_5:4.8R:190H_2O$

The synthetic mother liquor was crystallized in a sealed reaction vessel at a crystallization temperature of 175° C. for 84 hours, and the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, a content by weight of the organic material of 15.6%, and the XRD data as shown in Table 6A. The aluminophosphate molecular sieve precursor was calcined at 550° C. for 5 hours to obtain an aluminophosphate molecular sieve, the product molecular sieve had a schematic chemical composition of $Al_2O_3.1.0\ P_2O_5$ as determined by inductively coupled plasma-atomic emission spectroscopy (ICP), a specific surface area of 408 m²/g, a micropore volume of 0.19 ml/g, and the XRD data as shown in Table 6B.

TABLE 6A

XRD data of the aluminophosphate molecular sieve precursor obtained in Example 6

| 2 theta (°) | Interplanar spacing (Å) | Relative intensity $(I/I_0) \times 100$ |
|---|---|---|
| 8.26 | 10.70 | 49.2 |
| 13.46 | 6.57 | 29.8 |
| 14.18 | 6.24 | 3.9 |
| 15.86 | 5.58 | 67.2 |
| 16.75 | 5.28 | 8.9 |
| 19.64 | 4.52 | 10.9 |
| 20.91 | 4.24 | 100 |
| 21.61 | 4.11 | 11.0 |
| 22.31 | 3.98 | 40.7 |
| 23.54 | 3.78 | 40.5 |
| 23.96 | 3.71 | 14.7 |
| 25.19 | 3.53 | 10.0 |
| 25.61 | 3.48 | 17.3 |
| 26.20 | 3.40 | 7.1 |
| 27.27 | 3.27 | 21.4 |
| 28.72 | 3.10 | 6.5 |
| 29.62 | 3.01 | 17.4 |

TABLE 6B

XRD data of the aluminophosphate molecular sieve obtained in Example 6

| 2 theta (°) | Interplanar spacing (Å) | Relative intensity $(I/I_0) \times 100$ |
|---|---|---|
| 8.44 | 10.47 | 86.0 |
| 13.82 | 6.40 | 100 |
| 13.94 | 6.35 | 23.9 |
| 16.26 | 5.45 | 19.1 |
| 16.46 | 5.38 | 22.7 |
| 17.32 | 5.11 | 4.5 |
| 19.76 | 4.49 | 8.4 |
| 21.44 | 4.14 | 27.7 |
| 21.76 | 4.08 | 33.8 |
| 24.14 | 3.68 | 27.9 |
| 24.51 | 3.63 | 16.6 |
| 25.76 | 3.46 | 23.7 |
| 27.95 | 3.19 | 20.2 |
| 28.26 | 3.15 | 11.1 |
| 29.50 | 3.02 | 28.7 |

Example 7

27.6 g of 20.75% 1,1-[1,4-phenylenebis(methylene)]bis-1-methylpyrrolidinium dihydroxide (R) solution was weighed, 0.698 g of pseudo-boehmite was added thereto while stirring, 2.88 g of 85% phosphoric acid solution was then slowly added dropwise, and stirred uniformly to obtain a synthetic mother liquor having the following composition expressed in molar ratio:

$1.0Al_2O_3:3.0P_2O_5:4.8R:190H_2O$

The above synthetic mother liquor was crystallized in a sealed reaction vessel at a crystallization temperature of 175° C. for 84 hours, the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.03, a content by weight of the organic material of 17.8%, and the XRD data as shown in Table 7A. The aluminophosphate molecular sieve precursor was calcined at 550° C. for 5 hours to obtain an aluminophosphate molecular sieve, the product molecular sieve had a schematic chemical composition of $Al_2O_3.1.03\ P_2O_5$ as determined by inductively coupled plasma-atomic emission spectroscopy (ICP), a specific surface area of 390 m²/g, a micropore volume of 0.17 ml/g, and the XRD data as shown in Table 7B.

TABLE 7A

XRD data of the aluminophosphate molecular sieve precursor obtained in Example 7

| 2 theta (°) | Interplanar spacing (Å) | Relative intensity $(I/I_0) \times 100$ |
|---|---|---|
| 8.20 | 10.77 | 44.9 |
| 13.42 | 6.59 | 27.3 |
| 14.13 | 6.26 | 8.3 |
| 15.82 | 5.60 | 68.2 |
| 16.75 | 5.28 | 29.4 |
| 19.60 | 4.52 | 19.2 |
| 20.87 | 4.25 | 87.4 |
| 21.54 | 4.12 | 19.6 |
| 22.27 | 3.99 | 100 |
| 23.50 | 3.78 | 38.2 |
| 23.90 | 3.72 | 19.0 |
| 25.15 | 3.54 | 38.4 |
| 25.54 | 3.48 | 29.4 |
| 26.20 | 3.37 | 14.6 |
| 27.22 | 3.27 | 20.0 |
| 28.66 | 3.11 | 12.8 |
| 29.56 | 3.02 | 30.7 |

TABLE 7B

XRD data of the aluminophosphate molecular sieve obtained in Example 7

| 2 theta (°) | Interplanar spacing (Å) | Relative intensity $(I/I_0) \times 100$ |
|---|---|---|
| 8.49 | 10.40 | 82.6 |
| 13.88 | 6.38 | 100 |
| 14.03 | 6.31 | 14.4 |
| 16.29 | 5.44 | 17.1 |
| 16.51 | 5.36 | 13.1 |
| 17.32 | 5.12 | 1.4 |
| 19.79 | 4.48 | 4.4 |
| 21.47 | 4.14 | 21.8 |
| 21.79 | 4.08 | 17.0 |
| 24.17 | 3.68 | 22.0 |
| 24.54 | 3.62 | 9.6 |
| 25.86 | 3.44 | 12.4 |
| 27.98 | 3.19 | 16.2 |
| 28.30 | 3.15 | 4.7 |
| 29.52 | 3.02 | 17.2 |

Example 8

27.6 g of 20.75% 1,1-[1,4-phenylenebis(methylene)]bis-1-methylpyrrolidinium dihydroxide (R) solution was weighed, 23 g of water was added, 0.698 g of pseudo-boehmite was added thereto while stirring, and then 2.30 g of 85% phosphoric acid solution was slowly added dropwise, and stirred uniformly to obtain a synthetic mother liquor having the following composition expressed in molar ratio:

1.0Al$_2$O$_3$:2.4P$_2$O$_5$:4.8R:400H$_2$O

The synthetic mother liquor was crystallized in a sealed reaction vessel at a crystallization temperature of 175° C. for 84 hours, the resulting crystallized product was washed and dried to obtain an aluminophosphate molecular sieve precursor, wherein the precursor had a molar ratio of phosphorus, calculated as P$_2$O$_5$, to aluminum, calculated as Al$_2$O$_3$, (i.e. P$_2$O$_5$/Al$_2$O$_3$), of 1.0, a content by weight of the organic material of 16.4%, and the XRD data as shown in Table 8A. The aluminophosphate molecular sieve precursor was calcined at 550° C. for 5 hours to obtain an aluminophosphate molecular sieve. The product molecular sieve had a schematic chemical composition of Al$_2$O$_3$.1.0 P$_2$O$_5$ as determined by inductively coupled plasma-atomic emission spectroscopy (ICP), a specific surface area of 392 m$^2$/g, a micropore volume of 0.19 ml/g, and the corresponding XRD data as shown in Table 8B.

TABLE 8A

XRD data of the aluminophosphate molecular sieve precursor obtained in Example 8

| 2 theta (°) | Interplanar spacing (Å) | Relative intensity (I/I$_0$) × 100 |
|---|---|---|
| 8.22 | 10.74 | 46.9 |
| 8.82 | 10.02 | 3.7 |
| 13.43 | 6.59 | 27.8 |
| 14.15 | 6.25 | 4.7 |
| 15.82 | 5.60 | 70.5 |
| 16.77 | 5.28 | 18.0 |
| 19.63 | 4.52 | 14.0 |
| 20.89 | 4.25 | 100 |
| 21.60 | 4.11 | 11.6 |
| 22.33 | 3.98 | 46.9 |
| 23.50 | 3.78 | 36.6 |
| 23.92 | 3.72 | 16.0 |
| 25.23 | 3.53 | 14.4 |
| 25.59 | 3.48 | 19.0 |
| 26.20 | 3.40 | 6.1 |
| 27.24 | 3.27 | 19.9 |
| 28.72 | 3.10 | 7.6 |
| 29.62 | 3.01 | 18.1 |

TABLE 8B

XRD data of the aluminophosphate molecular sieve obtained in Example 8

| 2 theta (°) | Interplanar spacing (Å) | Relative intensity (I/I$_0$) × 100 |
|---|---|---|
| 8.53 | 10.36 | 86.1 |
| 13.91 | 6.36 | 100 |
| 14.10 | 6.28 | 25.3 |
| 16.35 | 5.42 | 16.1 |
| 16.58 | 5.34 | 31.3 |
| 17.41 | 5.09 | 4.3 |
| 19.86 | 4.47 | 7.4 |
| 21.53 | 4.12 | 20.4 |
| 21.90 | 4.06 | 45.6 |
| 24.24 | 3.67 | 20.2 |
| 24.67 | 3.61 | 25.3 |
| 25.96 | 3.43 | 22.1 |
| 28.05 | 3.18 | 15.9 |
| 28.43 | 3.13 | 9.9 |
| 29.65 | 3.01 | 25.2 |

Example 9

8.6 g of 20.75% 1,1-[1,4-phenylenebis(methylene)]bis-1-methylpyrrolidinium dihydroxide (R) solution was weighed, 0.698 g of pseudo-boehmite was added thereto while stirring, 1.15 g of 85% phosphoric acid solution was then slowly added dropwise, and stirred uniformly to obtain a synthetic mother liquor having the following composition expressed in molar ratio:

1.0Al$_2$O$_3$:1.2P$_2$O$_5$:1.5R:190H$_2$O

The synthetic mother liquor was crystallized in a sealed reaction vessel at a crystallization temperature of 190° C. for 60 hours, and the resulting crystallized product was washed and dried to obtain an aluminophosphate molecular sieve precursor, wherein the precursor had a molar ratio of phosphorus, calculated as P$_2$O$_5$, to aluminum, calculated as Al$_2$O$_3$, (i.e. P$_2$O$_5$/Al$_2$O$_3$), of 0.99, a content by weight of the organic material of 16.3%, and the XRD data as shown in Table 9A. The aluminophosphate molecular sieve precursor was calcined at 550° C. for 5 hours to obtain an aluminophosphate molecular sieve. The product molecular sieve had a schematic chemical composition of Al$_2$O$_3$.0.99 P$_2$O$_5$ as determined by inductively coupled plasma-atomic emission spectroscopy (ICP), a specific surface area of 310 m$^2$/g, a micropore volume of 0.15 ml/g, and the corresponding XRD data as shown in Table 9B.

TABLE 9A

XRD data of the aluminophosphate molecular sieve precursor obtained in Example 9

| 2 theta (°) | Interplanar spacing (Å) | Relative intensity (I/I$_0$) × 100 |
|---|---|---|
| 8.33 | 10.61 | 49.1 |
| 8.90 | 9.92 | 5.0 |
| 13.52 | 6.54 | 34.7 |
| 14.26 | 6.21 | 9.5 |
| 15.92 | 5.56 | 76.1 |
| 16.86 | 5.26 | 26.9 |
| 19.73 | 4.50 | 12.6 |
| 20.97 | 4.23 | 100 |
| 21.70 | 4.09 | 15.5 |
| 22.40 | 3.96 | 73.2 |
| 23.58 | 3.77 | 32.0 |
| 24.01 | 3.70 | 15.3 |
| 25.28 | 3.52 | 24.1 |
| 25.68 | 3.47 | 21.4 |
| 26.28 | 3.39 | 9.8 |
| 27.30 | 3.26 | 20.5 |
| 28.80 | 3.10 | 9.5 |
| 29.69 | 3.01 | 22.8 |

TABLE 9B

XRD data of the aluminophosphate molecular sieve obtained in Example 9

| 2 theta (°) | Interplanar spacing (Å) | Relative intensity $(I/I_0) \times 100$ |
|---|---|---|
| 8.51 | 10.38 | 77.0 |
| 13.90 | 6.37 | 100 |
| 14.08 | 6.28 | 25.1 |
| 16.34 | 5.42 | 17.5 |
| 16.56 | 5.35 | 29.0 |
| 17.39 | 5.10 | 4.1 |
| 19.85 | 4.47 | 6.6 |
| 21.52 | 4.13 | 22.2 |
| 21.87 | 4.06 | 41.2 |
| 24.20 | 3.67 | 20.9 |
| 24.63 | 3.61 | 22.7 |
| 25.86 | 3.44 | 17.3 |
| 28.03 | 3.18 | 17.8 |
| 28.40 | 3.14 | 10 |
| 29.61 | 3.01 | 23.5 |

Example 10

27.6 g of 20.75% 1,1-[1,4-phenylenebis(methylene)]bis-1-methylpyrrolidinium dihydroxide (R) solution was weighed, 84 g of aluminum isopropoxide was added thereto while stirring, 2.30 g of 85% phosphoric acid solution was then slowly added dropwise, and stirred uniformly to obtain a synthetic mother liquor having the following composition expressed in molar ratio:

$1.0Al_2O_3:2.4P_2O_5:4.8R:190H_2O$

The synthetic mother liquor was crystallized in a sealed reaction vessel at a crystallization temperature of 190° C. for 60 hours, and the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, a content by weight of the organic material of 20.1%, and the XRD data as shown in Table 10A. The aluminophosphate molecular sieve precursor was calcined at 550° C. for 5 hours to obtain an aluminophosphate molecular sieve. The product molecular sieve had a schematic chemical composition of $Al_2O_3 \cdot 1.0 P_2O_5$ as determined by inductively coupled plasma-atomic emission spectroscopy (ICP), a specific surface area of 345 m²/g, a micropore volume of 0.17 ml/g, and the corresponding XRD data as shown in Table 10B.

TABLE 10A

XRD data of the aluminophosphate molecular sieve precursor obtained in Example 10

| 2 theta (°) | Interplanar spacing (Å) | Relative intensity $(I/I_0) \times 100$ |
|---|---|---|
| 8.37 | 10.56 | 40.9 |
| 8.96 | 9.86 | 10.6 |
| 13.58 | 6.52 | 19.6 |
| 14.31 | 6.18 | 11.2 |
| 15.98 | 5.54 | 47.4 |
| 16.91 | 5.24 | 33.4 |
| 19.78 | 4.48 | 11.8 |
| 21.02 | 4.22 | 56.8 |
| 21.74 | 4.08 | 11.9 |
| 22.44 | 3.96 | 100 |
| 23.63 | 3.76 | 19.5 |
| 24.06 | 3.70 | 11.0 |
| 25.32 | 3.51 | 35.3 |
| 25.72 | 3.46 | 16.6 |
| 26.32 | 3.38 | 9.9 |
| 27.35 | 3.26 | 12.0 |
| 28.84 | 3.09 | 13.4 |
| 29.73 | 3.00 | 22.4 |

TABLE 10B

XRD data of the aluminophosphate molecular sieve obtained in Example 10

| 2 theta (°) | Interplanar spacing (Å) | Relative intensity $(I/I_0) \times 100$ |
|---|---|---|
| 8.59 | 10.29 | 60.8 |
| 13.95 | 6.34 | 100 |
| 14.10 | 6.28 | 14.9 |
| 16.38 | 5.41 | 18.2 |
| 16.58 | 5.34 | 14.9 |
| 17.38 | 5.10 | 2.4 |
| 19.88 | 4.46 | 5.1 |
| 21.54 | 4.12 | 24.3 |
| 21.86 | 4.06 | 18.0 |
| 24.24 | 3.67 | 24.4 |
| 24.61 | 3.61 | 9.2 |
| 25.88 | 3.44 | 16.9 |
| 28.04 | 3.18 | 22.0 |
| 28.38 | 3.14 | 5.3 |
| 29.58 | 3.02 | 19.6 |

Example 11

27.6 g of 20.75% 1,1-[1,4-phenylenebis(methylene)]bis-1-methylpyrrolidinium dihydroxide (R) solution was weighed, 0.84 g of aluminum isopropoxide was added thereto while stirring, and then 2.30 g of 85% phosphoric acid solution was slowly added dropwise, and stirred uniformly to obtain a synthetic mother liquor having the following composition expressed in molar ratio:

$1.0Al_2O_3:2.4P_2O_5:4.8R:190H_2O$

The above synthetic mother liquor was crystallized in a sealed reaction vessel at a crystallization temperature of 150° C. for 120 hours, the resulting crystallized product was washed and dried to obtain an aluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.01, a content by weight of the organic material of 14.7%, and the XRD data as shown in Table 11A. The aluminophosphate molecular sieve precursor was calcined at 550° C. for 5 hours to obtain an aluminophosphate molecular sieve. The product molecular sieve had a schematic chemical composition of $Al_2O_3 \cdot 1.01 P_2O_5$ as determined by inductively coupled plasma-atomic emission spectroscopy (ICP), a specific surface area of 372 m²/g, a micropore volume of 0.16 ml/g, and the corresponding XRD data as shown in Table 11B.

TABLE 11A

XRD data of the aluminophosphate molecular sieve precursor obtained in Example 11

| 2 theta (°) | Interplanar spacing (Å) | Relative intensity $(I/I_0) \times 100$ |
|---|---|---|
| 8.20 | 10.77 | 42.3 |
| 13.40 | 6.60 | 28.8 |
| 14.13 | 6.26 | 5.2 |
| 15.81 | 5.60 | 68.1 |
| 16.75 | 5.28 | 18.2 |
| 19.59 | 4.53 | 11.4 |
| 20.82 | 4.26 | 100 |
| 21.54 | 4.12 | 11.5 |
| 22.31 | 3.99 | 47.0 |
| 23.49 | 3.78 | 34.4 |
| 23.88 | 3.72 | 16.3 |
| 25.15 | 3.54 | 19.5 |
| 25.54 | 3.48 | 19.9 |
| 26.20 | 3.40 | 9.4 |
| 27.16 | 3.28 | 23.0 |
| 28.66 | 3.11 | 8.6 |
| 29.54 | 3.02 | 22.8 |

TABLE 11B

XRD data of the aluminophosphate molecular sieve obtained in Example 11

| 2 theta (°) | Interplanar spacing (Å) | Relative intensity $(I/I_0) \times 100$ |
|---|---|---|
| 8.48 | 10.42 | 64.0 |
| 13.86 | 6.38 | 100 |
| 14.03 | 6.31 | 15.0 |
| 16.28 | 5.44 | 15.6 |
| 16.50 | 5.37 | 14.8 |
| 17.33 | 5.11 | 2.4 |
| 19.80 | 4.48 | 4.8 |
| 21.46 | 4.14 | 22.0 |
| 21.81 | 4.07 | 20.5 |
| 24.16 | 3.68 | 21.9 |
| 24.56 | 3.62 | 10.8 |
| 25.80 | 3.45 | 12.8 |
| 27.97 | 3.19 | 17.8 |
| 28.31 | 3.15 | 5.6 |
| 29.54 | 3.02 | 18.7 |

Example 12

2 g sample of the powder obtained in Example 2 was mixed thoroughly with 3 g of alumina and 0.2 g of sesbania powder, and then 5 ml of 5 wt % nitric acid was added to the mixture, kneaded and extruded into a bar of φ1.6×2 mm, and the bar was dried at 110° C. and calcined at 550° C. for 8 hours in an air atmosphere to obtain a molecular sieve composition. The molecular sieve composition can be used as an adsorbent or a catalyst.

Example 13

To each of 20 g different liquid adsorbates, 2 g of the SCM-18 molecular sieve composition obtained in Example 12 was added at room temperature, and the mixture was stirred for 12 hours for adsorption, and then filtered to separate the sample. The resulting solid sample was weighed using an electronic balance (to the accuracy of 0.001 g) after drying in a flowing nitrogen atmosphere at 40° C. for 2 hours, and the adsorption capacity was calculated according to the following equation, and the results are shown in Table 12:

Adsorption capacity=(weight of the sample after adsorption−initial weight of the sample)+initial weight of the sample.

For comparison, dried AlPO-5, AlPO-11, ZSM-5 molecular sieves and 3 A molecular sieve were each formulated into a composition as described in Example 12, and 2 g of each composition was taken for adsorption performance testing, and the results are shown in Table 12. In addition, 2 g of silica gel was also taken for adsorption performance testing, and the results are also shown in Table 12.

TABLE 12

Adsorption capacity of different adsorbents for different adsorbates

| Adsorbent | Adsorption capacity × 100 | | | | |
|---|---|---|---|---|---|
| | $H_2O$ | Iso-butane | n-hexane | Cyclo-hexane | Toluene |
| The inventive molecular sieve | 39.8 | 1.5 | 6.3 | 1.4 | 2.5 |
| AlPO-5 molecular sieve | 25.2 | 4.9 | 5.7 | 6.6 | 5.9 |
| AlPO-11 molecular sieve | 23.9 | 3.3 | 4.8 | 3.2 | 6.1 |
| ZSM-5 molecular sieve | 30.0 | 5.2 | 7.1 | 3.9 | 6.2 |
| 3A molecular sieve | 33.2 | 1.2 | 7.8 | 1.2 | 1.3 |
| Silica gel | 35.7 | 1.3 | 1.5 | 1.6 | 1.2 |

As can be seen from Table 12, the molecular sieve/molecular sieve composition of the present application can be used as a adsorbent for many small organic molecules and water, and particularly has a good adsorption capacity for $H_2O$.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. An aluminophosphate molecular sieve having a schematic chemical composition of $Al_2O_3 \cdot nP_2O_5$, expressed in molar ratio, wherein n represents a phosphorus to aluminum molar ratio, and is in a range of about 0.8 to about 1.2, and the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.20-8.60 | 10.27-10.77 | VS |
| 13.73-13.99 | 6.32-6.44 | VS |

| 2 theta (°) | Interplanar spacing (Å) | Relative intensity (I/I₀) × 100 |
|---|---|---|
| 16.16-16.41 | 5.39-5.48 | W-M |
| 16.36-16.61 | 5.33-5.41 | W-M |
| 21.34-21.58 | 4.11-4.16 | W-M |
| 21.66-21.91 | 4.05-4.10 | M-S |
| 24.04-24.32 | 3.66-3.70 | W-M. |

2. The aluminophosphate molecular sieve of claim 1, wherein the molecular sieve has an X-ray diffraction pattern exhibiting a relative intensity profile shown in the following table:

| 2 theta (°) | Interplanar spacing (Å) | Relative intensity (I/I₀) × 100 |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M. |

3. The aluminophosphate molecular sieve according to claim 2, wherein the molecular sieve has an X-ray diffraction pattern exhibiting a relative intensity profile shown in the following table:

| 2 theta (°) | Interplanar spacing (Å) | Relative intensity (I/I₀) × 100 |
|---|---|---|
| 8.20-8.60 | 10.27-10.77 | VS |
| 13.73-13.99 | 6.32-6.44 | VS |
| 13.90-14.20 | 6.23-6.36 | W-M |
| 16.16-16.41 | 5.39-5.48 | W-M |
| 16.36-16.61 | 5.33-5.41 | W-M |
| 17.17-17.42 | 5.08-5.16 | W |
| 19.66-19.91 | 4.45-4.51 | W |
| 21.34-21.58 | 4.11-4.16 | W-M |
| 21.66-21.91 | 4.05-4.10 | M-S |
| 24.04-24.32 | 3.66-3.70 | W-M |
| 24.41-24.65 | 3.61-3.64 | W-M |
| 25.71-25.96 | 3.43-3.46 | W-M |
| 27.85-28.12 | 3.17-3.20 | W-M |
| 28.18-28.43 | 3.13-3.16 | W |
| 29.40-29.66 | 3.01-3.03 | M. |

4. The aluminophosphate molecular sieve according to claim 1, wherein the molecular sieve has a specific surface area of about 150-500 m²/g, and a micropore volume of about 0.9-0.25 ml/g.

5. A method for preparing an aluminophosphate molecular sieve according to claim 1, comprising the steps of:
   i) providing an aluminophosphate molecular sieve precursor, wherein the precursor has an X-ray diffraction pattern exhibiting a relative intensity profile as shown in the following table:

| 2 theta (°) | Interplanar spacing (Å) | Relative intensity (I/I₀) × 100 |
|---|---|---|
| 8.20-8.38 | 10.54-10.77 | S-VS |
| 13.40-13.61 | 6.50-6.60 | M-S |
| 15.81-15.99 | 5.54-5.60 | S-VS |
| 16.75-16.97 | 5.22-5.28 | W-M |
| 20.82-21.09 | 4.21-4.26 | S-VS |
| 22.31-22.52 | 3.94-3.98 | S-VS |
| 23.49-23.68 | 3.75-3.78 | M, | and
   ii) calcining the aluminophosphate molecular sieve precursor to obtain the aluminophosphate molecular sieve.

6. The method according to claim 5, wherein the precursor has an X-ray diffraction pattern exhibiting a relative intensity profile as shown in the following table:

| 2 theta (°) | Interplanar spacing (Å) | Relative intensity (I/I₀) × 100 |
|---|---|---|
| 8.20-8.38 | 10.54-10.77 | S-VS |
| 13.40-13.61 | 6.50-6.60 | M-S |
| 15.81-15.99 | 5.54-5.60 | S-VS |
| 16.75-16.97 | 5.22-5.28 | W-M |
| 19.59-19.86 | 4.46-4.53 | W |
| 20.82-21.09 | 4.21-4.26 | S-VS |
| 22.31-22.52 | 3.94-3.98 | S-VS |
| 23.49-23.68 | 3.75-3.78 | M |
| 23.88-24.16 | 3.65-3.72 | W-M |
| 25.15-25.42 | 3.50-3.54 | W-M |
| 25.54-25.82 | 3.45-3.48 | W-M |
| 27.16-27.44 | 3.25-3.28 | W-M |
| 29.54-29.82 | 2.99-3.02 | W-M. |

7. The method according to claim 5, wherein the step i) further comprises:
   ia) mixing an aluminum source, a phosphorus source, an organic material R and water at a molar ratio of the aluminum source (calculated as Al₂O₃): the phosphorus source (calculated as P₂O₅):R:H₂O of about 1:(1.0-3.0):(1.5-6.0):(50-500) to obtain a synthetic mother liquor; and
   ib) subjecting the synthetic mother liquor to crystallization to obtain the aluminophosphate molecular sieve precursor,
   wherein the organic material R is an ammonium hydroxide having the following formula:

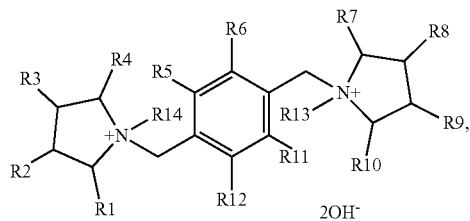

wherein the groups R1-R12, which may be identical or different from each other, are independently selected from H and C₁₋₆ alkyl groups, and
the groups R13 and R14, which may be identical or different from each other, are independently selected from C₁₋₆ alkyl groups.

8. The method according to claim 7, wherein in step ia) the aluminum source, the phosphorus source, the organic material R and water are mixed at a molar ratio of the aluminum source (calculated as Al₂O₃): the phosphorus source (calculated as P₂O₅):R:H₂O of about 1: (1.0-2.0): (2.5-4.8):(100-300).

9. The method according to claim 7, wherein the organic material R is 1,1-[1,4-phenylenebis(methylene)]bis-1-methylpyrrolidinium dihydroxide.

10. The method according to claim 7, wherein step ib) is carried out under the following conditions:
a sealed reaction vessel, a crystallization temperature of about 130-200° C., and a crystallization time of about 24-150.

11. The method according to claim 7, wherein the aluminum source is one or more selected from the group consisting of pseudo-boehmite, aluminum isopropoxide, aluminum sol, aluminum hydroxide, aluminum sulfate, aluminum chloride and aluminum oxide;
and/or the phosphorus source is one or more selected from the group consisting of phosphoric acid, orthophosphorous acid and phosphorus pentoxide.

12. The method according to claim 5, wherein the aluminophosphate molecular sieve precursor has a molar ratio of phosphorus, calculated as P₂O₅, to aluminum, calculated as Al₂O₃, in a range of about 0.8 to about 1.2, and
optionally, the aluminophosphate molecular sieve precursor comprises from about 8 wt % to about 40 wt % of an organic material, based on the weight of the aluminophosphate molecular sieve precursor.

13. A molecular sieve composition comprising an aluminophosphate molecular sieve according to claim 1, and a binder.

14. A method for treating automobile exhaust gas, comprising contacting a catalyst comprising the aluminophosphate molecular sieve to claim 1 loaded with copper with the automobile exhaust gas to cause decomposition of nitrogen oxides in the automobile exhaust gas.

15. A method for removing water from a water-containing material to be dried, comprising: contacting the molecular sieve composition according to claim 13 with the water-containing material, whereby the molecular sieve composition adsorbs water from the water-containing material, wherein the water-containing material is an organic solvent or natural gas.

16. The aluminophosphate molecular sieve according to claim 4, wherein the molecular sieve has a specific surface area of about 200-400 m²/g; and a micropore volume of about 0.10-0.20 ml/g.

17. The method according to claim 6, wherein the precursor has an X-ray diffraction pattern exhibiting a relative intensity profile as shown in the following table:

| 2 theta (°) | Interplanar spacing (Å) | Relative intensity (I/I₀) × 100 |
|---|---|---|
| 8.20-8.38 | 10.54-10.77 | S-VS |
| 8.80-9.06 | 9.75-10.04 | W |
| 13.40-13.61 | 6.50-6.60 | M-S |
| 14.13-14.39 | 6.15-6.26 | W |
| 15.81-15.99 | 5.54-5.60 | S-VS |
| 16.75-16.97 | 5.22-5.28 | W-M |
| 19.59-19.86 | 4.46-4.53 | W |
| 20.82-21.09 | 4.21-4.26 | S-VS |
| 21.54-21.84 | 4.06-4.12 | W |
| 22.31-22.52 | 3.94-3.98 | S-VS |
| 23.49-23.68 | 3.75-3.78 | M |
| 23.88-24.16 | 3.65-3.72 | W-M |
| 25.15-25.42 | 3.50-3.54 | W-M |
| 25.54-25.82 | 3.45-3.48 | W-M |
| 26.20-26.41 | 3.37-3.40 | W |
| 27.16-27.44 | 3.25-3.28 | W-M |
| 28.66-28.90 | 3.08-3.11 | W |
| 29.54-29.82 | 2.99-3.02 | W-M. |

18. The method according to claim 7, wherein wherein in the formula of the organic material R, the groups R1-R12, which may be identical or different from each other, are independently selected from from H and $C_{1-3}$ alkyl groups; and
the groups R13 and R14, which may be identical or different from each other, are independently selected from $C_{1-3}$ alkyl groups.

19. The method according to claim 10, wherein step ib) is carried out under the following conditions: a sealed reaction vessel, a crystallization temperature of about 145-185° C., and a crystallization time of about 48-120 hours.

20. The method according to claim 11, wherein the aluminum source is selected from the group consisting of pseudo-boehmite and aluminum isopropoxide; and the phosphorus source is phosphoric acid.

* * * * *